(12) United States Patent
Takahashi (10) Patent No.: US 7,346,963 B2
(45) Date of Patent: Mar. 25, 2008

(54) CORD STOPPER

(75) Inventor: Yoshinobu Takahashi, Kurobe (JP)

(73) Assignee: YKK Corporation, Tokyo (JP)

( * ) Notice: Subject to any disclaimer, the term of this patent is extended or adjusted under 35 U.S.C. 154(b) by 65 days.

(21) Appl. No.: 11/339,056

(22) Filed: Jan. 25, 2006

(65) Prior Publication Data

US 2006/0168770 A1 Aug. 3, 2006

(30) Foreign Application Priority Data

Jan. 28, 2005 (JP) .............................. 2005-021509

(51) Int. Cl.
*F16G 11/03* (2006.01)
(52) U.S. Cl. ................................... 24/136 R
(58) Field of Classification Search ............. 24/136 R, 24/115 R, 115 M, 715.5, 715.6, 136 B; 403/374.11, 403/409.1, 211; 16/428, 442
See application file for complete search history.

(56) References Cited

U.S. PATENT DOCUMENTS

| 1,573,737 | A | * | 2/1926 | Norman | ...................... | 403/274 |
| 5,170,538 | A | * | 12/1992 | Zarembo | ................... | 24/136 R |
| 5,289,613 | A | * | 3/1994 | Kohl | ........................... | 16/108 |
| 5,383,259 | A | * | 1/1995 | McIntire | ...................... | 24/300 |

FOREIGN PATENT DOCUMENTS

| JP | 2001-340113 | 12/2001 |
| JP | 2004-204376 | 7/2004 |

* cited by examiner

*Primary Examiner*—James R Brittain
(74) *Attorney, Agent, or Firm*—Alston & Bird LLP (57) ABSTRACT

A cord stopper (1) of the present invention includes a socket (2) and a plug (3). The plug (3) includes a pair of arms (32) and a catching section (35) arranged on facing surfaces of the pair of arms (32) to catch a cord. The catching section (35) includes a holding section (36) arranged on one of the pair of arms (32) and a pressing projection (37) arranged on the other one of the arms (32). The holding section (36) and the pressing projection (37) are arranged so as to face each other.

6 Claims, 12 Drawing Sheets

CORD STOPPER

BACKGROUND OF THE INVENTION

1. Field of the Invention

The present invention relates to a cord stopper, more specifically to a cord stopper that is used for an end treatment of a cord.

2. Description of Related Art

Cords have been widely used for closing openings of shoes, bags, garments and clothing accessories, adjusting sizes thereof, and the like.

Further, the cords have been used in various situations such as coupling articles and fixing goods.

Note that the cords herein refer to all kinds of corded bodies that can be used for binding, examples of which include a tape, a belt, an elastic cord and the like in addition to a typical cord, a wire, a cable, etc.

These cords are typically provided with an end treatment, because simply cutting the cords causes cut surfaces thereof to have rough appearance or rough texture, and in a case with twisted cords, the cut surfaces might be frayed.

Although the simplest end treatment is to provide a knot, there have been proposed to attach a dedicated cord stopper for enhancing operability and fanciness (see, for instance, Reference 1: JP2004-204376A and Reference 2: JP2001-340113).

A conventional cord stopper includes a cylindrical socket and a plug that is inserted into the socket, the plug then being engaged within the socket with an end of a cord being caught therein. In use, the end of the cord is inserted into the socket from one opening of the socket. The end of the cord is pulled out from the other opening of the socket and then grasped between a pair of grasping legs of the plug, the plug then being inserted into the other opening of the socket. When the plug is engaged within the socket, the end of the cord is enclosed in the socket, and the end of the cord being caught by the plug can be prevented from being disengaged from the socket.

In the cord stopper described above, it is important to tightly fix the end of the cord within the socket so as not to be disengaged from the socket even when the cord is pulled.

Reference 1 discloses an arrangement including: two projections provided on one of the grasping legs of the plug, the projections being arranged to have a U-shaped cross section for holding the cord therein; and a projection provided on the other one of the grasping legs, the projections being arranged alternately in a combed manner. With the arrangement, when the end of the cord is grasped between the grasping legs, the cord is curved and grasped by the projections arranged in the combed manner.

However, since the cross section of the projections is U-shape in Reference 1, a cord with thin diameter might be disengaged. Especially, a corded body such as an elastic cord, the diameter of which becomes thinner when being pulled and stretched, can easily be disengaged when the elastic cord is pulled. In addition, since the surface of the elastic cord has a surface fiber density higher than those of typical cords, the elastic cord cannot be properly grasped by the arrangement in which the cord is curved and grasped by the projections arranged in the combed manner as disclosed in Reference 1. Further, since the projections are arranged in the combed manner, a grasping force is weak.

SUMMARY OF THE INVENTION

An object of the present invention is to provide a cord stopper with enhanced fixing force for a cord.

A cord stopper according to an aspect of the present invention includes: a cylindrical socket into which an end of a cord is inserted from a cord opening; a plug that is inserted into the socket from a plug opening formed on a side opposite to the cord opening, the plug grasping the end of the cord; and an engaging section for engaging the plug within the socket, the cord stopper fixing the end of the cord within the socket. The plug includes: at least a pair of arms that can be inserted into the socket, the arms grasping the end of the cord; and a catching section arranged on facing surfaces of the pair of arms to catch the cord grasped between the pair of arms, the catching section including: a holding section arranged on one of the pair of arms, the holding section having a groove for grasping the cord therein; and a pressing projection arranged on the other one of the pair of arms to press the cord onto the groove of the holding section. The holding section and the pressing projection are arranged so as to face each other.

With the arrangement, the end of the cord is inserted into the socket from the cord opening, and the plug is inserted into the socket from the plug opening. With the end of the cord being grasped by the plug, the plug is engaged within the socket by the engaging section. The end of the cord is fixed within the socket while being grasped by the plug, by which an end treatment is provided to the cord. At this time, the end of the cord is grasped between the pair of the arms and further caught by the catching sections provided on the facing surfaces of the pair of arms. The catching sections catch the cord between the holding section and the pressing projection, where the holding section and the pressing projection that face each other catch the cord being fitted in the groove of the holding section. Since the cord can be tightly caught by the groove and the projection (pressing projection) that face each other, the cord can be prevented from being disengaged.

In the cord stopper according to the aspect of the present invention, it is preferable that the holding section has two holding pieces respectively having inclined surfaces, the inclined surfaces facing each other, and that the inclined surfaces of the two holding pieces are positioned closer to each other at piece base sides relative to at piece tip sides so that the groove is formed in V-shaped.

With the arrangement, when the cord is caught by the holding section and the pressing projection, the cord is fitted in the V-shaped groove and further pressed onto the deepest part (base side) of the V-shaped groove by the pressing projection, so that the cord can be held. Since the groove is V-shaped, even the cord with thin diameter can be pressed onto the deepest part (base side) of the thin groove, so that the cord can be tightly caught by the pressing projection and the holding section. Thus, the cord can be fixed by the plug, thereby preventing the cord from being disengaged from the socket.

In the cord stopper according to the aspect of the present invention, it is preferable that each of the inclined surfaces facing each other of the holding section has a larger inclination angle at the piece tip side than at the piece base side.

With the arrangement, since the deepest part (base side) of the V-shaped groove defines a thin groove, even the cord with thin diameter can be pressed and fit into the deepest part of the thin groove, so that the cord can be tightly caught by the pressing projection and the holding section. Thus, the cord can be fixed by the plug, thereby preventing the cord from being disengaged from the socket.

Herein, according to the aspect of the present invention, there are preferably provided two or more catching sections.

With the arrangement, since two or more catching sections are provided, a catching force becomes large as compared to an arrangement having only one catching section, so that the end of the cord can be fixed within the socket and prevented from being disengaged therefrom.

However, it is obvious that the number of the catching section may be one.

Incidentally, in the arrangement having two or more catching sections, all of the holding sections may be arranged on one of the arms, while all of the pressing projections may be arranged on the other one of the arms.

Alternatively, the holding sections and the pressing projections may be arranged alternately on the one of the arms so that, when the cord is grasped by the pair of arms, pressing directions in which the cord fitted in the grooves of the holding sections is pressed by the pressing projections are orientated alternately. With the arrangement, since the cord is curved when being caught by the plurality of catching sections between the pair of arms, the cord becomes difficult to be disengaged from the plug, thus preventing the cord from being disengaged from the socket.

In the cord stopper according to the aspect of the present invention, it is preferable that the socket includes a stress applying section for applying a stress to the pair of arms so that the pair of arms grasping the cord therebetween are moved in a direction toward each other as the plug relatively moves from a plug opening side to a cord opening side, the stress applying section including: a first stress applying section extending from the plug opening to a middle point between the plug opening and the cord opening; and a second stress applying section extending from the first stress applying section to the cord opening, and that the second stress applying section is adapted to apply a larger stress than the first stress applying section.

With the arrangement, the plug is pressed into the socket from the plug opening with the cord being grasped between the pair of arms. Then, the pair of arms is moved toward each other due to the stress applied by the stress applying section (first stress applying section), so that the cord grasped between the arms is caught by the catching section (the holding section and the pressing projection). By engaging the plug within the socket with the cord being caught by the catching section, the end of the cord is fixed within the socket. Here, when the cord is pulled from the cord opening with the end of the cord being fixed within the socket, since the plug catches the cord, the plug is pulled toward the cord opening. When the plug is pulled and moved toward the cord opening, the second stress applying section applies a larger stress to the arms. Then, the pair of arms is tightened inward to catch the cords more tightly. Accordingly, the cord can be prevented from being disengaged from the socket even when being pulled from the cord opening.

In the cord stopper according to the aspect of the present invention, it is preferable that the stress applying section is formed of tapered surfaces arranged on an inner side of the socket so as to gradually narrow a distance between facing inner walls of the socket from the plug opening toward the cord opening, the tapered surface including a first tapered surface and a second tapered surface, and that the second tapered surface constituting the second stress applying section has an inclination angle larger than that of the first tapered surface constituting the first stress applying section.

With the arrangement, the plug is pressed into the socket from the plug opening with the cord being grasped between the pair of arms. Then, the pair of arms is tightened by the tapered surfaces, so that the cord being grasped between the arms is caught by the catching section (the holding section and the pressing projection). When the plug is engaged within the socket with the cord being caught by the catching section, the end of the cord is fixed within the socket.

Here, when the cord is pulled from the cord opening with the end of the cord being fixed within the socket, since the plug catches the cord, the plug is pulled toward the cord opening.

When the plug is pulled and moved toward the cord opening, the arms are tightened by the tapered surfaces of the second stress applying section. Since the inclination angle of the tapered surfaces of the second stress applying section is large, the second stress applying section applies the larger stress to the arms. At this time, since the second stress applying section is formed of the tapered surface, the stress applied to the arms becomes larger as the cord is pulled from the cord opening and the plug is moved toward the cord opening. Thus, the catching force of the catching section becomes larger and the cord becomes more difficult to be disengaged as the cord is pulled toward the cord opening. Accordingly, the cord can be prevented from being disengaged from the socket even when being pulled from the cord opening.

By increasing the inclination angle of the tapered surface, an axial length of a product can be shortened, thereby downsizing the product.

In the cord stopper according to the aspect of the present invention, it is preferable that a tip tapered surface is arranged on each of the tip sides of the arms to receive the stress applied by the stress applying section, the tip sides of the arms being positioned on the cord opening side when the arms are inserted into the socket, and that the tapered surface constituting the second stress applying section has an inclination angle corresponding to the tip tapered surface.

With the arrangement, the stress can be focused onto the tip sides of the arms, thus efficiently tightening the pair of arms. This is because application of the stress to the tips of the arms allows a large force to act on the arms more efficiently due to the principle of leverage. Consequently, the catching force of the catching section for catching the cord becomes large, thus increasing the fixing force for the cord.

Herein, in order to form the tapered surface of the second stress applying section so as to have an inclination angle corresponding to that of the tip tapered surfaces on the inner side of the socket, for instance, the tapered surface of the second stress applying section is formed to have an inclination angle identical with those of the tip tapered surfaces, or to have such an inclination angle that can allow the tip tapered surfaces to abut on the tapered surface of the second stress applying section when the arms are moved closer toward the cord opening and that slides the tips of the arms toward each other.

In providing the tip tapered surfaces on the tips of the arms, each of the tip tapered surfaces is preferably provided at a position the same as the catching section or at a position closer to the tips of the arms relative to the catching section.

DETAILED DESCRIPTION OF PREFERRED EMBODIMENT(S)

An embodiment of the present invention will be described below with reference to the attached drawings and a reference numeral assigned to each component of the drawings.

An embodiment regarding a cord stopper 1 of the present invention will be described.

Figure 1:
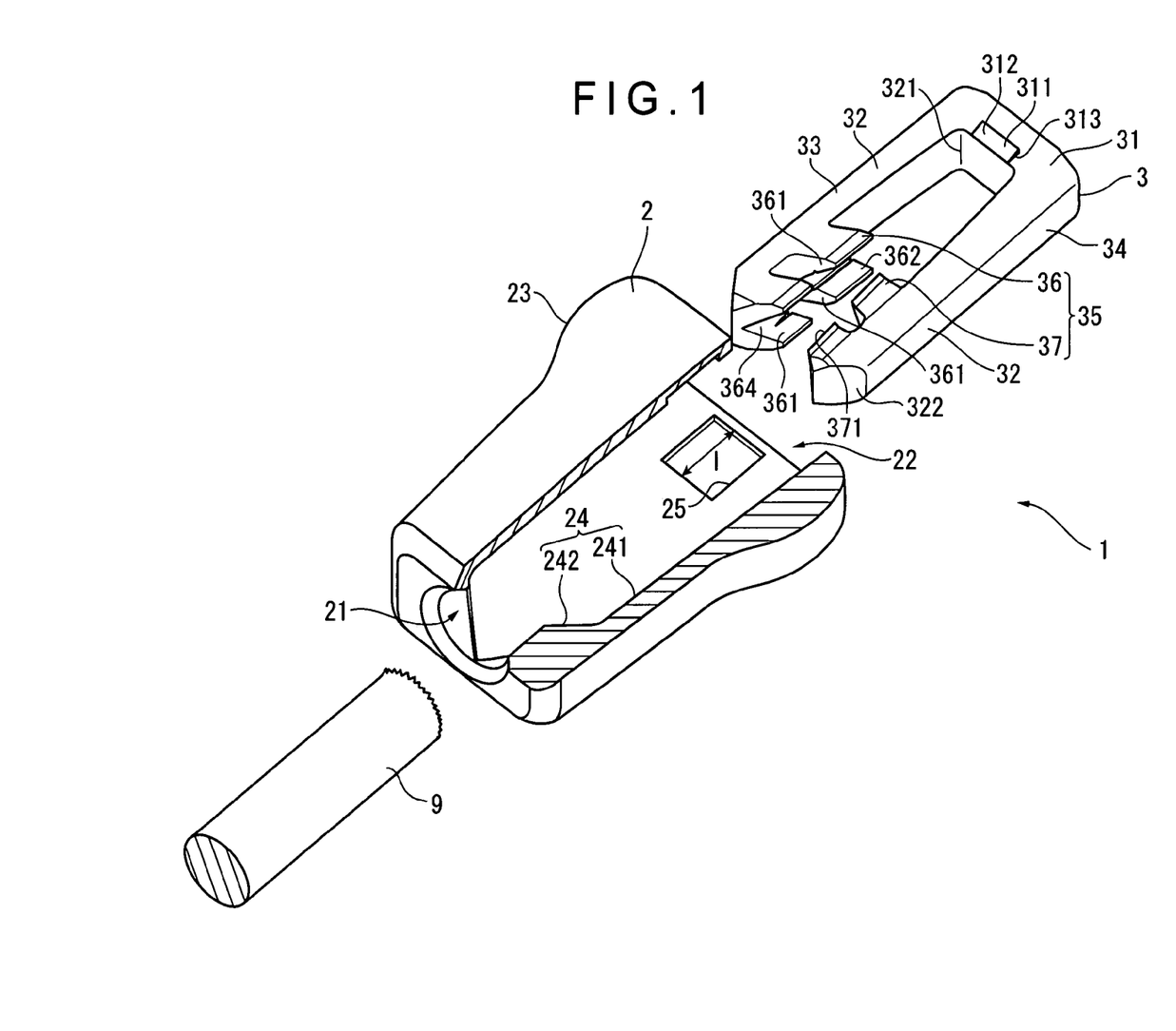
FIG. 1 is an entire perspective view of a cord stopper according to an embodiment of the present invention.

FIG. 1 is an entire perspective view of the cord stopper 1 with a part of a socket 2 taken away therefrom.

The cord stopper 1 includes the socket 2 and a plug 3 that is inserted into the socket 2.

The socket 2 is a cylindrical body and has: a cord opening 21 for an end of a cord to be inserted therefrom on one end (a side) of the cylindrical body; and a plug opening 22 for the plug 3 to be inserted therefrom on the other end (the other side).

The opening area of the cord opening 21 is slightly larger than the cross section of a cord 9, while the opening area of the plug opening 22 is a size that allows the plug 3 to be inserted therefrom. Since the cord opening 21 only has the opening area close to the cross section of the cord, the plug 3 inserted from the plug opening 22 does not come out from the cord opening 21.

The socket 2 is formed to have a substantially flattened as a whole shape and chamfered. The socket 2 is slightly narrow on the one end and gradually widened from the one end toward the other end, the socket 2 being provided with a bulged portion 23 from a middle part thereof toward the other end, on which a finger can be applied.

An inner side of the socket 2 is defined by tapered surfaces 24 that gradually reduces a distance therebetween, i.e., between facing inner walls of the socket 2 from the plug opening 22 toward the cord opening 21.

First tapered surfaces 241 extending from the plug opening 22 toward a middle part between the plug opening 22 and the cord opening 21 have a gentle inclination, while second tapered surfaces 242 arranged around the cord opening 21 has a sharp inclination. Examples of inclination angles is 2 to 5 degrees for the first tapered surface 241 and 30 to 50 degrees for the second tapered surface 242.

The tapered surface 24 constitutes a stress applying section, where the first tapered surface 241 serves as a first stress applying section, while the second tapered surface 242 serves as a second stress applying section.

An engaging dent 25 for engaging with the plug 3 is arranged in the inner wall on the other side of the socket 2. The engaging dent 25 has a predetermined length in an axial direction of the cylindrical socket 2.

Although the socket 2 made of a synthetic resin such as polyacetal and the like is exemplified, a material of the socket 2 is not particularly limited.

Figure 2:
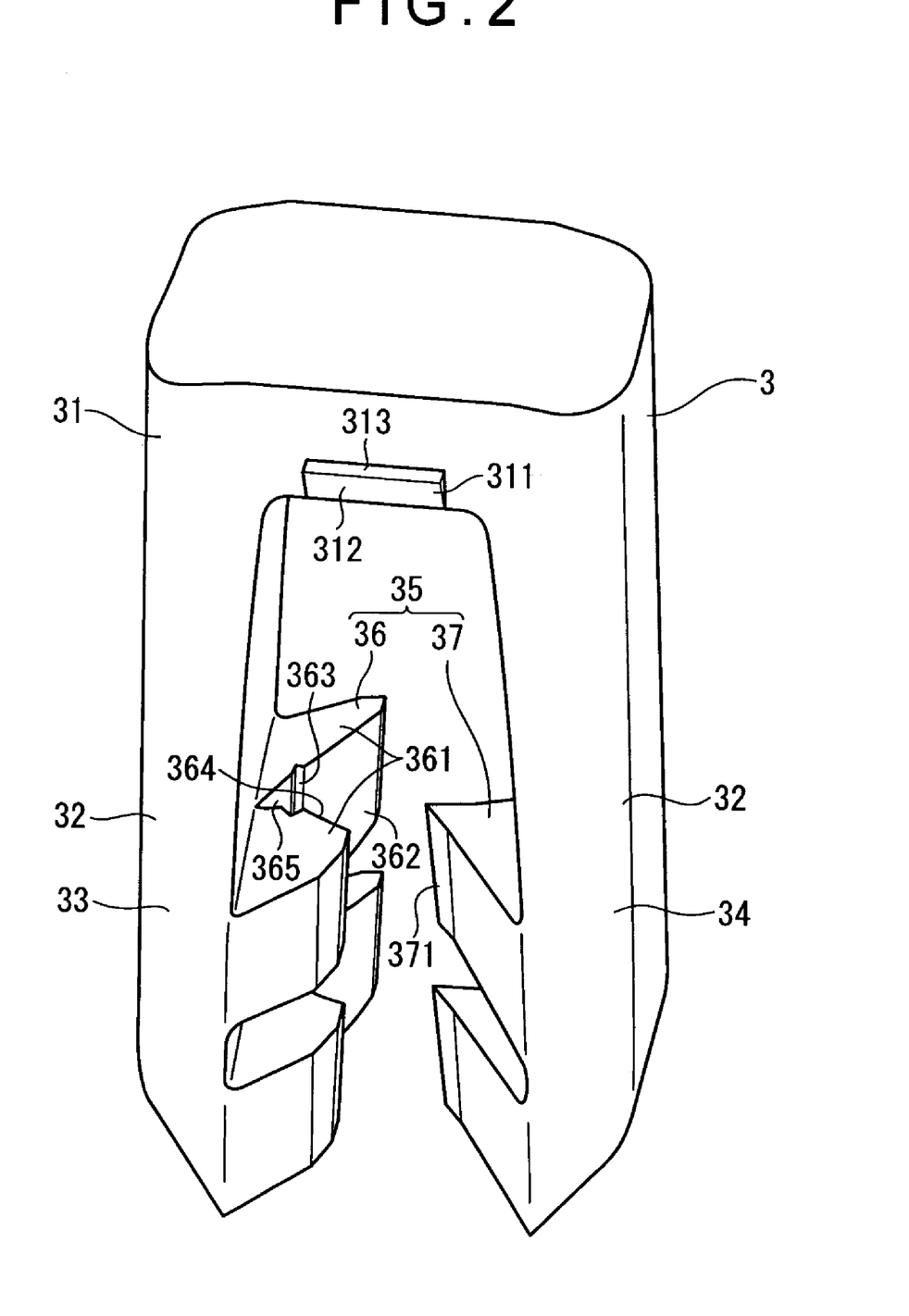
FIG. 2 is a perspective view of a plug of the embodiment.

FIG. 2 is a perspective view of the plug 3.

The plug 3 includes a head 31 defining a base side of the plug 3, a pair of arms 32, 32 projecting from the head 31 toward a tip of the plug 3 and catching sections 35 arranged on facing surfaces of the arms 32, 32 to catch the cord grasped between the pair of arms 32, 32.

The head 31 is provided with an engaging nail 311 that engages with the engaging dent 25 of the socket 2 when the plug 3 is inserted into the socket 2. The engaging dent 25 and the engaging nail 311 constitute an engaging section.

The engaging nail 311 is formed in a triangular prism, in which a surface on a tip side of the plug defines an inclined surface 312, while a surface on a base side of the plug defines a vertical surface 313.

The arms 32, 32 are flexible arms that are elastically deformable to be widened outward or narrowed inward around roots 321 as connecting points between the head 31 and the arms 32, 32. The arms 32, 32 can be widened to sandwich and grasp therebetween the end of the cord, to which an end treatment is provided. On tip outer sides of the arms 32, 32 are formed tip tapered surfaces 322 that are chamfered so as to be narrowed toward the tips.

The arm 32 on the left side in FIG. 2 will be referred to as a left arm 33, while the arm 32 on the right side in FIG. 2 will be referred to as a right arm 34 for convenience of description.

There are provided two catching sections 35 on the tip side and the deeper side (base side) of the arms 32, 32. The two catching sections 35 have substantially the same arrangements, each of which includes a holding section 36 provided on the left arm 33 and a pressing projection 37 provided on the right arm 34.

The holding section 36 is formed of two holding pieces 361 respectively having inclined surfaces 362 that face each other.

The inclined surfaces 362 of the two holding pieces 361 are placed closer to each other at piece base sides relative to at piece tip sides, so that a groove defined by the two inclined surfaces 362 forms a V-shaped groove 364.

Figure 7:
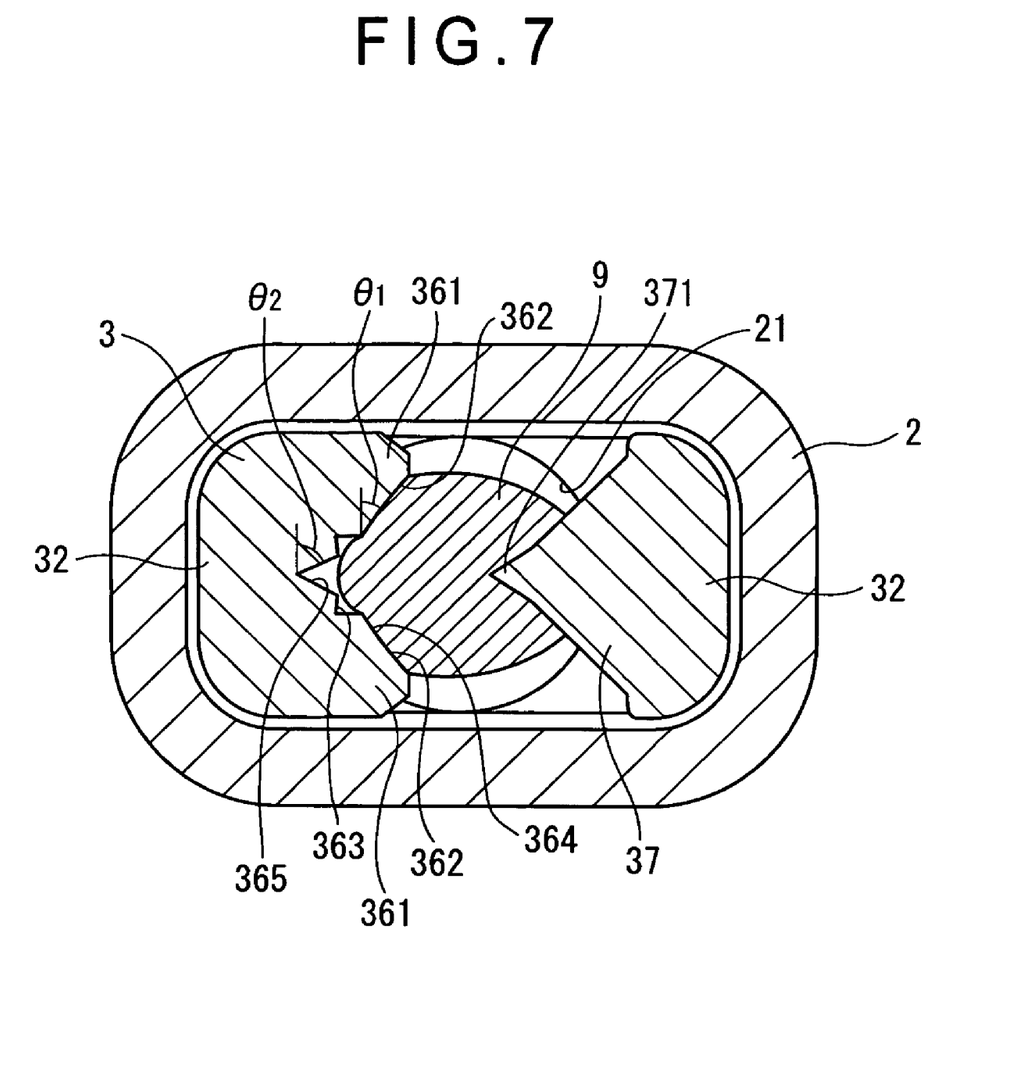
FIG. 7 is a cross section taken along the line VII-VII, which shows the state where the plug is engaged within the socket according to the embodiment.

Inclination of each of the facing inclined surfaces 362 of the holding section 36 changes at a middle point, and an inclination angle at the piece base side (θ2 in FIG. 7) is larger than an inclination angle at the piece tip side (θ1 in FIG. 7).

With the arrangement, the width of the groove that is wide at the piece tip sides is gradually narrowed toward the piece base sides, and further narrowed steeply from the middle point to define a thin groove 365 having very small vertex angle on the piece base sides. An assisting groove 363 is notched on each of the inclined surfaces 362.

Incidentally, the piece base side of the holding piece 361 is positioned relatively closer to the tip of the arm 32, while the piece tip side of the holding piece 361 is positioned relatively closer to the base of the arm 32. The holding section 36 formed on the arm 33 is arranged at a position corresponding to the pressing projection 37 of the arm 34, and the holding section 36 is inclined toward the base of the arm 32 to form like an inverted hook.

The pressing projection 37 is provided so as to face the holding section 36.

The pressing projection 37 has a substantially triangular cross section, which is a shape corresponding to the V-shaped groove 364 of the holding section 36, and has a thin projection 371 on a projection tip side, the thin projection 371 projecting sharply relative to an inclination angle of a projection base side (base).

The pressing projection 37 is inclined toward the base of the arm 32, the projection base side of which is positioned relatively closer to the tip of the arm 32, and the projection tip side of which is positioned relatively closer to the base of the arm 32, the pressing projection 37 being formed like an inverted hook in plan view.

Note that the plug is integrally molded, in other words, the head 31, the arms 32, 32 and the catching sections 35 are integrally molded as a component. Although the plug made of a synthetic resin such as polyacetal and the like can be exemplified, a material of the plug is not particularly limited.

Next, usage and behavior of the cord stopper 1 having the arrangement as described above of the embodiment will be described.

Note that, in the following description, an elastic cord 9 is exemplified as the cord 9 to be subjected to the end treatment.

Figure 3:
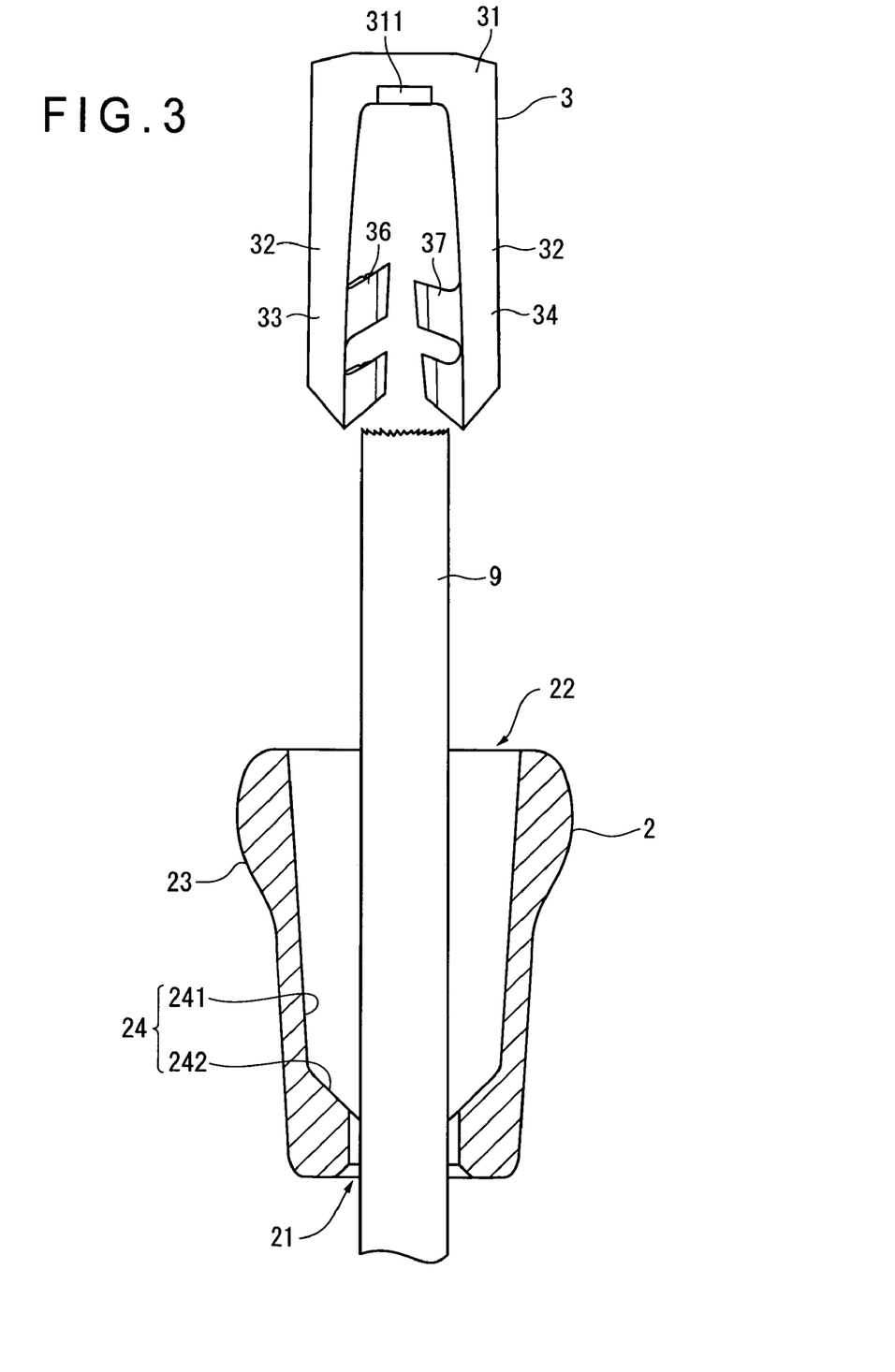
FIG. 3 is a plan view of a partial cross section showing a state where a cord is laced through a socket according to the embodiment.
Figure 4:
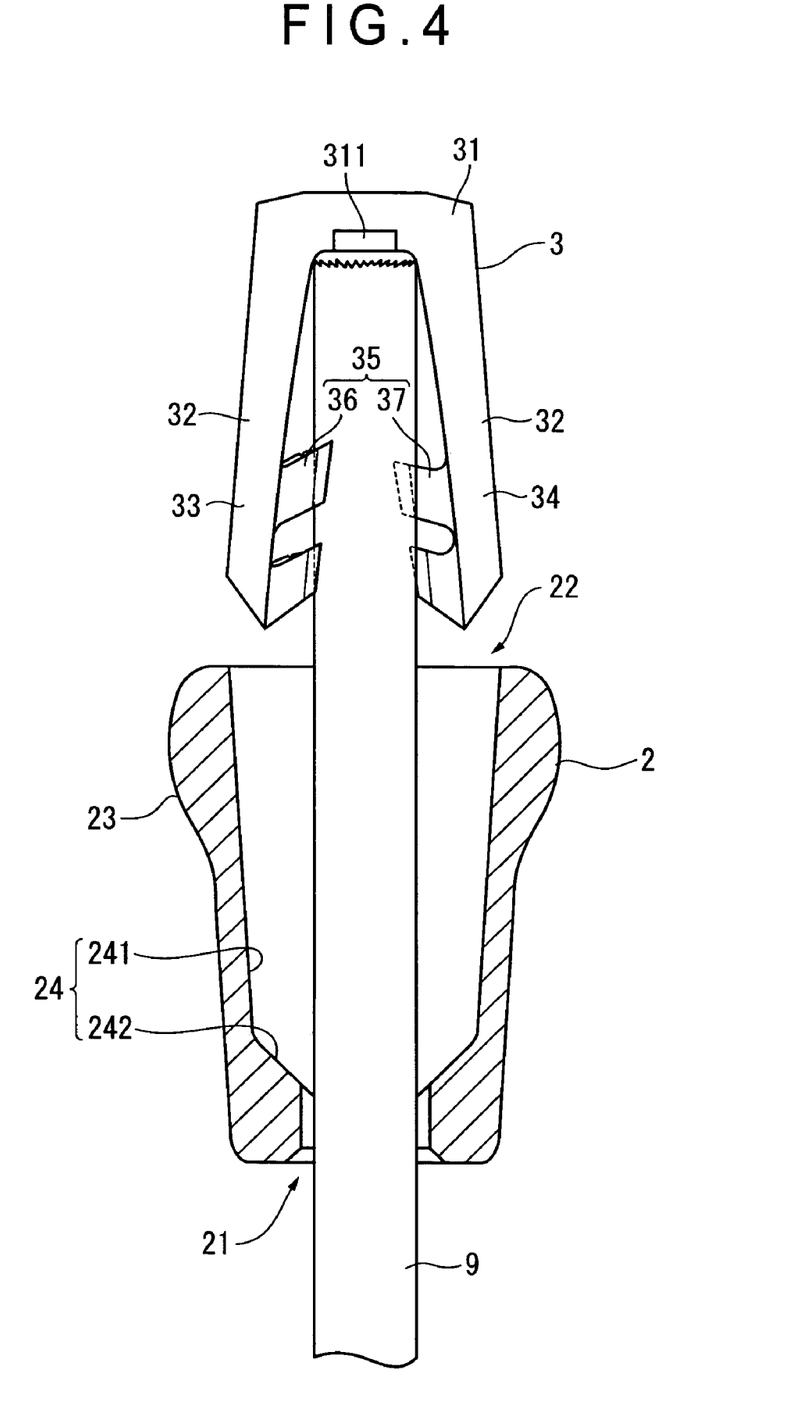
FIG. 4 is a plan view of a partial cross section showing a state where an end of the cord laced through the socket is grasped by the plug according to the embodiment.
Figure 5:
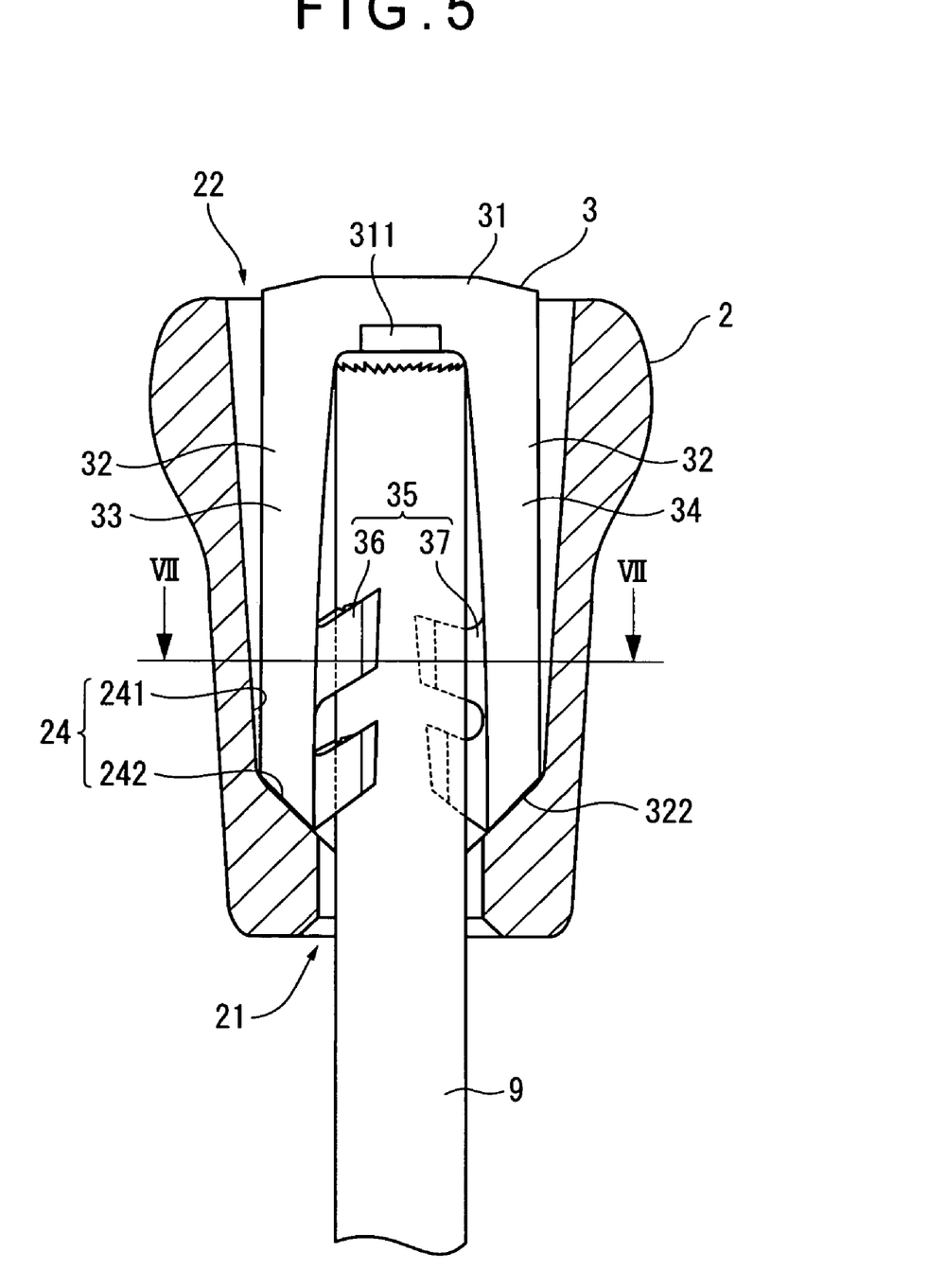
FIG. 5 is a plan view of a partial cross section showing a state where the plug is engaged within the socket according to the embodiment.
Figure 6:
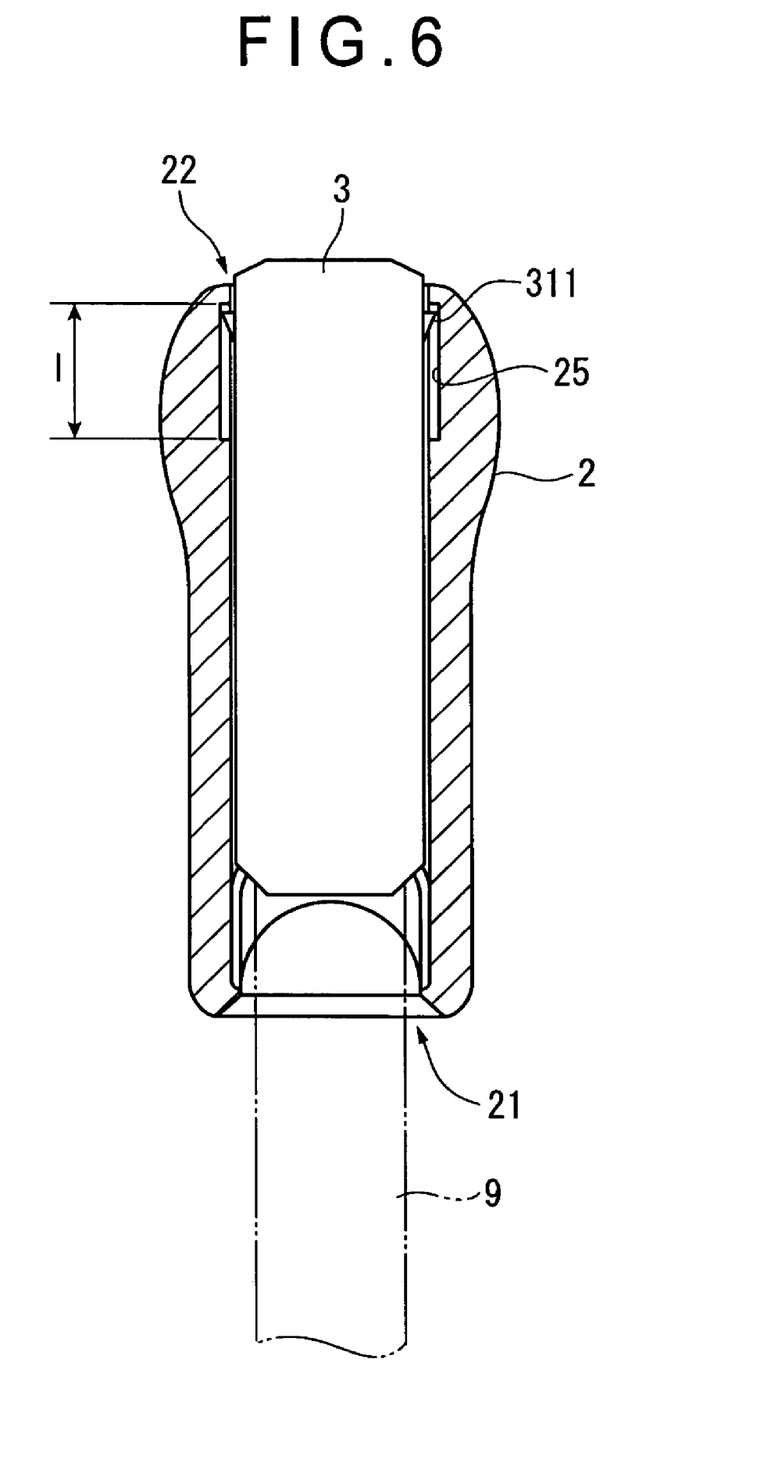
FIG. 6 is a side view of a partial cross section showing the state where the plug is engaged within the socket according to the embodiment.

FIG. 3 is a plan view of a partial cross section showing a state where the cord 9 is laced through the socket 2. FIG. 4 is a plan view of a partial cross section showing a state where the end of the cord 9 laced through the socket 2 is grasped by the plug 3. FIG. 5 is a plan view of a partial cross section showing a state where the plug 3 is engaged within the socket 2. FIG. 6 is a side view of a partial cross section showing the state where the plug 3 is engaged within the socket 2. FIG. 7 is a cross section taken along the line VII-VII in FIG. 5, which shows the state where the plug 3 is engaged within the socket 2.

In performing the end treatment of the cord 9 using the cord stopper 1, the end of the cord 9 is first inserted into the socket 2 from the cord opening 21 and pulled out from the plug opening 22 (see FIG. 3).

Then, the arms 32, 32 are widened to grasp therebetween the end of the cord 9 (see FIG. 4).

At this time, the cord 9 should be fitted in the V-shaped groove 364 of the holding section 36.

With the state above, the plug 3 is inserted into the socket 2.

The tip tapered surfaces 322 as tip outer sides of the arms 32, 32 abut on the inner wall of the socket 2. By pressing the plug 3 into the socket 2, since the arms 32, 32 have been pressed and widened due to the cord 9 grasped therebetween, a stress for tightening the arms 32, 32 inward is applied to the right and left arms 32, 32 by the tapered surface 24 as the inner side of the socket 2.

When the right and left arms 32, 32 are tightened inward, the holding section 36 and the pressing projection 37 are moved closer to each other as if to be fitted in each other to catch the cord 9 that is grasped therebetween (see, FIG. 7).

When the plug 3 is further pressed into the socket 2, the arms 32, 32 are further tightened gradually by the tapered surface 24 (specifically, the first tapered surface 241), so that the cord 9 is caught and tightly fixed between the holding section 36 and the pressing projection 37.

Then, as shown in FIGS. 5 and 6, when the head 31 is pressed into the socket 2 to be enclosed therein, the engaging nail 311 of the head 31 engages with the engaging dent 25 of the socket 2, so that the plug 3 is engaged within the socket 2. At this time, the tip tapered surfaces 322 of the arms 32, 32 abut on the second tapered surfaces 242 of the socket 2, by which the pair of arms 32, 32 is tightened inward more tightly.

Then, the end of the cord 9 is tightly caught and fixed by the plug 3 within the socket 2, thereby providing the end treatment to the cord 9.

Next, a behavior of the cord 9 when being pulled strongly will be described.

Figure 8:
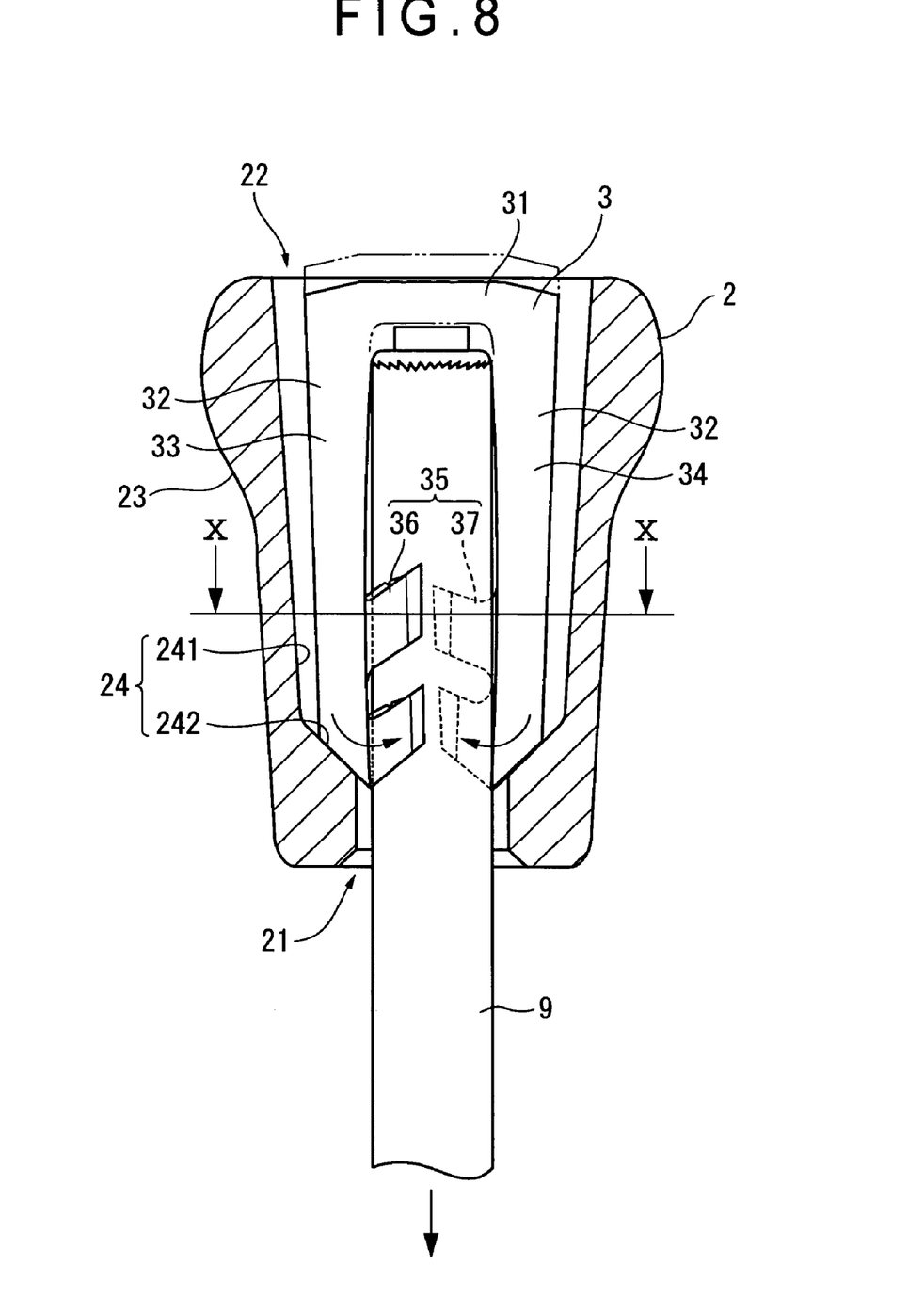
FIG. 8 is a plan view showing a behavior of the cord when being pulled from a cord opening according to the embodiment.
Figure 9:
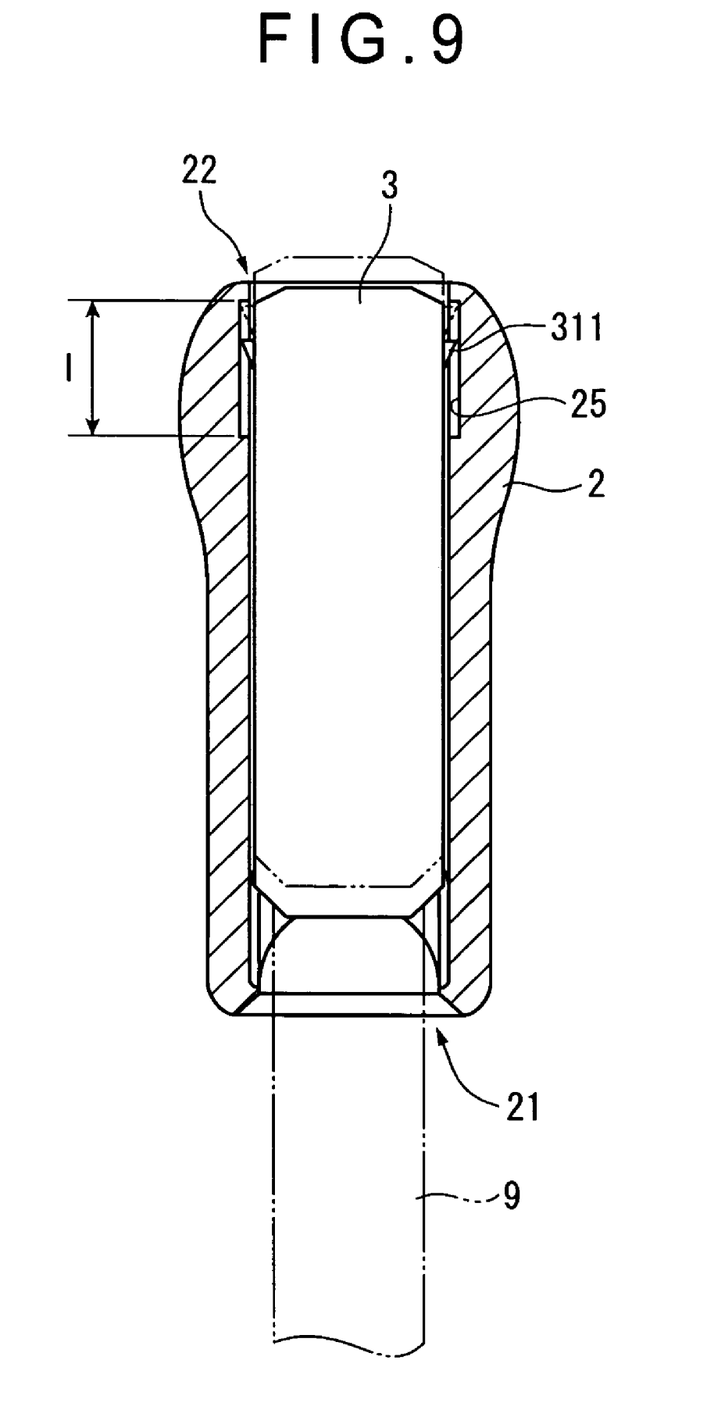
FIG. 9 is a side view showing the behavior of the cord when being pulled from the cord opening according to the embodiment.
Figure 10:
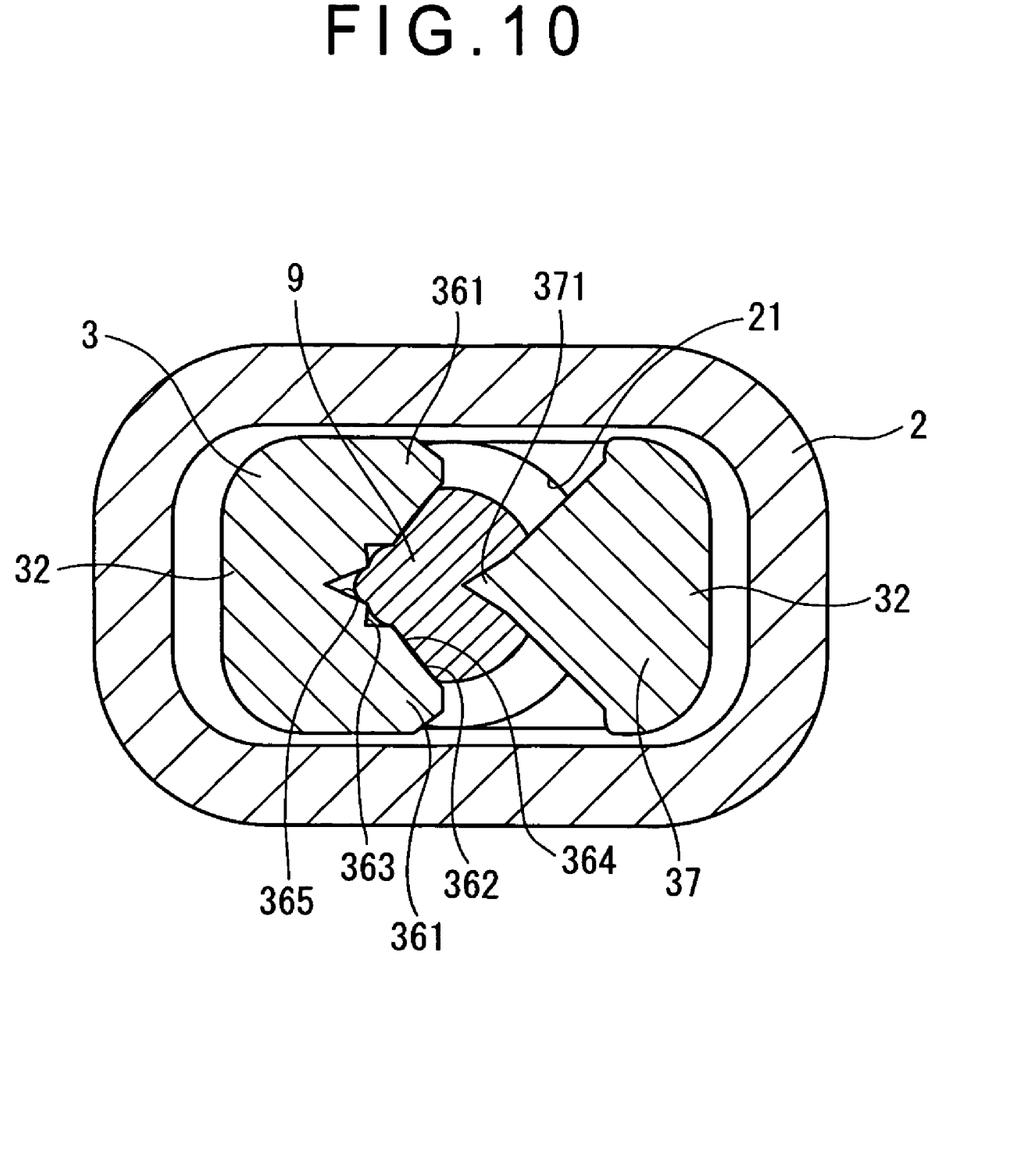
FIG. 10 is a cross section taken along the line X-X in FIG. 8 according to the embodiment.

FIG. 8 is a plan view showing a behavior of the cord 9 when being pulled from the cord opening 21. FIG. 9 is a side view showing the behavior of the cord 9 when being pulled from the cord opening 21. FIG. 10 is a cross section taken along the line X-X in FIG. 8.

When the cord 9 fixed within the socket 2 and provided with the end treatment is pulled strongly in a direction in which the cord 9 is pulled out from the cord opening 21, since the plug 3 catches the cord 9 with the catching section 35, the plug 3 is also pulled together with the cord 9. At this time, since the engaging dent 25 has a predetermined length 1 in an axial direction of the socket 2 as shown in FIG. 9, the plug 3 can be moved toward the cord opening 21 side.

When the plug 3 is pulled toward the cord opening 21 of the socket 2, the tips of the arms 32, 32 (the tip tapered surfaces 322) are pressed onto the second tapered surface 242 of the socket 2. Then, the arms 32, 32 are further tightened inward by the second tapered surface 242 each having a large inclination angle. This causes the holding section 36 and the pressing projection 37 to further move closer to each other, so that the catching section 35 tightly catches the cord 9. When the plug 3 is pulled toward the cord opening 21 together with the cord 9 being pulled, the more strongly the cord 9 is pulled, the more tightly the arms 32, 32 are tightened by the second tapered surfaces 242.

At this time, although the elastic cord 9 being pulled is elastically deformed to be thinner, the catching force of the holding section 36 and the pressing projection 37 are further increased with the arms 32, 32 tightened inward, so that the cord 9 is pressed into the thin groove 365 and the assisting groove 363 of the holding section 36 and caught more tightly.

Therefore, no matter how strong the cord 9 is pulled, the cord 9 is not disengaged from the catching section 35 of the plug 3, thereby preventing the cord 9 being pulled out from the cord opening 21 of the socket 2.

According to the embodiment having the above arrangement, the following advantages can be obtained.

(1) The cord 9 is caught between the holding section 36 and the pressing projection 37, where the holding section 36 and the pressing projection 37 that face each other catch the cord 9 being fitted in the groove 364 of the holding section 36. Since the cord 9 is caught by the groove and the projection (pressing projection 37) that face each other, the cord 9 can be tightly caught, preventing the cord 9 from being disengaged.

(2) When the cord 9 is caught by the holding section 36 and the pressing projection 37, the cord 9 is fitted in the V-shaped groove 364 and further pressed onto the deepest part (base side) of the V-shaped groove 364 by the pressing projection 37, so that the cord 9 can be held by the V-shaped groove 364. With the V-shaped groove 364, even when the cord 9 with the diameter that is thinned when being pulled is used, the cord 9 can be pressed onto the deepest part (base side) of the thin groove and can be tightly caught by the pressing projection 37 and the holding section 36. Therefore, the cord 9 can be fixed by the plug 3, thereby preventing the cord 9 from being disengaged from the socket 2.

(3) Since the deepest part (base side) of the V-shaped groove 364 defines the thin groove, the cord 9 with thinning diameter can be pressed and fit into the deepest part of the thin groove, so that the cord 9 can be caught by the pressing projection 37 and the holding section 36. Therefore, the cord 9 can be fixed by the plug 3, thereby preventing the cord 9 from being disengaged from the socket 2.

(4) When the cord 9 is pulled from the cord opening 21, although the plug 3 catching the cord 9 is also pulled and moved toward the cord opening 21, the arms 32, 32 are tightened by the second tapered surface 242 of the second stress applying section as the plug 3 is pulled and moved toward the cord opening 21. At this time, since the inclination angle of the second tapered surface 242 of the second stress applying section is large, the second stress applying section applies larger stress to the arms 32, 32. Since the second stress applying section is constituted by the tapered surface (the second tapered surface 242), the further the cord 9 is pulled from and moved toward the cord opening 21, the larger stress can be applied to the arms 32, 32. Thus, the catching force of the catching section 35 becomes larger and the cord 9 becomes more difficult to be disengaged as the cord 9 is pulled further toward the cord opening. Accordingly, the cord 9 can be prevented from being disengaged from the socket 2 even when the cord 9 is pulled from the cord opening 21.

(5) Since the two catching sections 35 are provided, the catching force becomes large as compared to an arrangement having only one catching section 35, so that the end of the cord 9 can be fixed within the socket 2 and prevented from being disengaged therefrom.

(6) Since the V-shaped groove 364 of the holding section 36 is provided with the assisting groove 363 in addition to the thin groove 365, the cord 9 can be fit into the assisting groove 363 to be more difficult to be disengaged when the cord 9 is caught between the holding section 36 and the pressing projection 37. Since the holding section 36 and the pressing projection 37 are formed like inverted hooks, the projection tip of the pressing projection 37 can bite into the cord 9 when the cord 9 is pulled from the cord opening 21, which causes the cord 9 to be difficult to be disengaged.

Incidentally, the present invention is not limited to the above-described embodiment, but includes modifications, improvements and the like as long as the object of the present invention can be attained.

Although the stress applying section for tightening the pair of arms to move closer to each other is constituted by the tapered surface formed on the inner side of the socket in the above description, a tapered surface may be formed on a lateral side of the plug for tightening the pair of arms.

The tapered surface may not even be provided to the socket and the plug, and a widened portion of the arms widened when grasping the cord therebetween may alternatively be utilized to tighten the arms.

Although the tapered surface on the inner side of the socket includes two tapered surfaces having different inclination angles, i.e., the first tapered surface and the second tapered surface in the above description, the second tapered surface may not be formed.

Although the inclination angle of the deepest part (base side) of the inclined surface of the holding section increases to form the thin groove in the above description, the thin groove may not be provided.

Although there are two catching sections in the above description, the number of the catching section may be one or three or more.

Although the cord stopper 1 holds only one cord 9 in the above-described embodiment, the cord stopper 1 may hold two or more cords 9.

Figure 11:
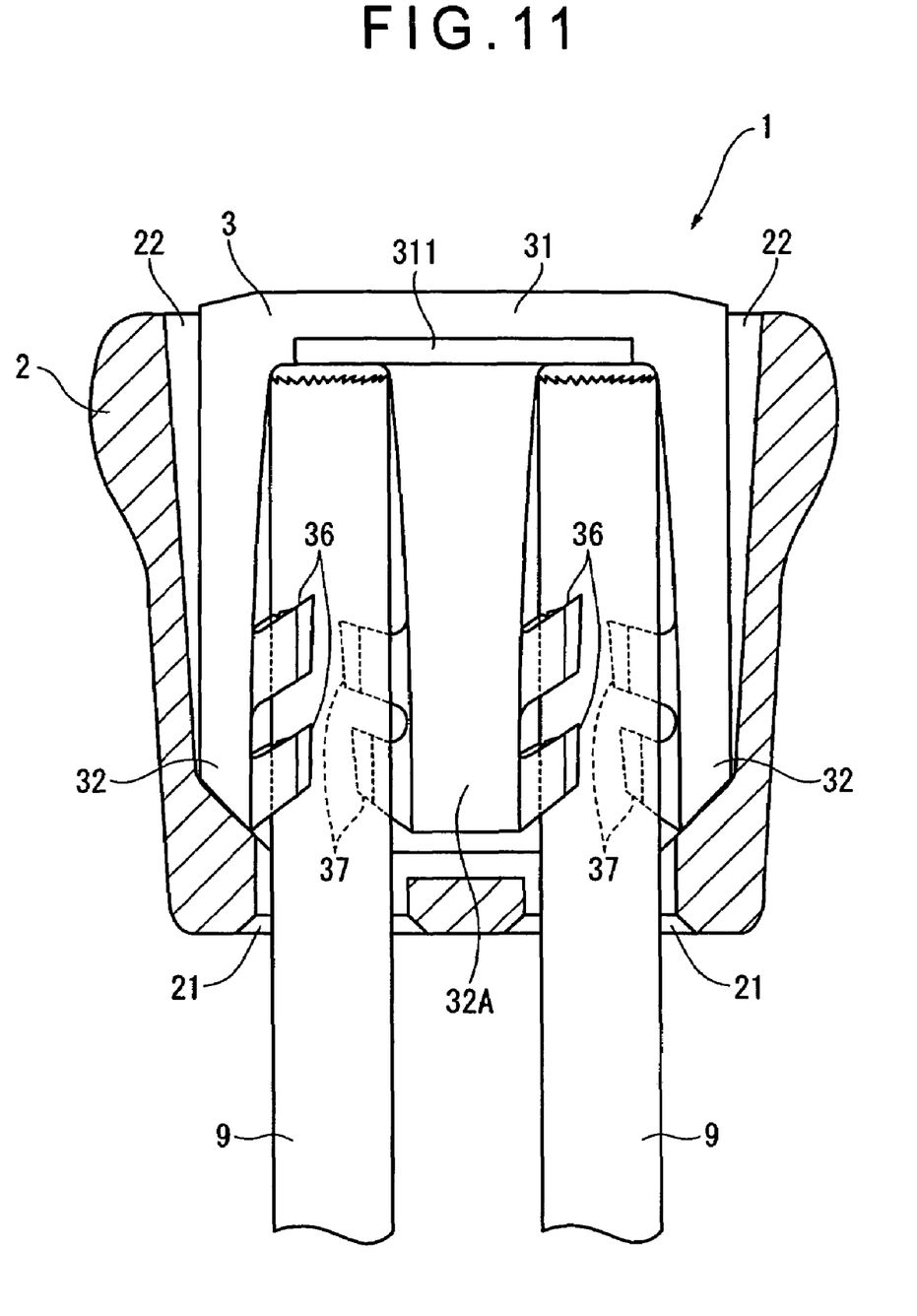
FIG. 11 is a vertical cross section showing another embodiment of the present invention.

As shown in FIG. 11, there may be provided two respective pairs of cord openings 21, holding sections 36 and pressing projections 37 for holding the two cords 9. In this drawing, the socket 2 has the two cord openings 21. The arrangement of the socket 2 is the same as the embodiment of FIG. 1 except the above-described point. Specifically, the plug 3 has another arm 32A between the pair of arms 32, and the two pairs of the holding sections 36 and the pressing projections 37 for the two cords 9 are formed respectively between the arm 32A and the arms 32. The two pairs of holding sections 36 and the pressing projections 37 are provided in a longitudinal direction of the cords 9 as in the embodiment of FIG. 1, and the detailed structures thereof are also the same as those in the embodiment of FIG. 1.

Figure 12:
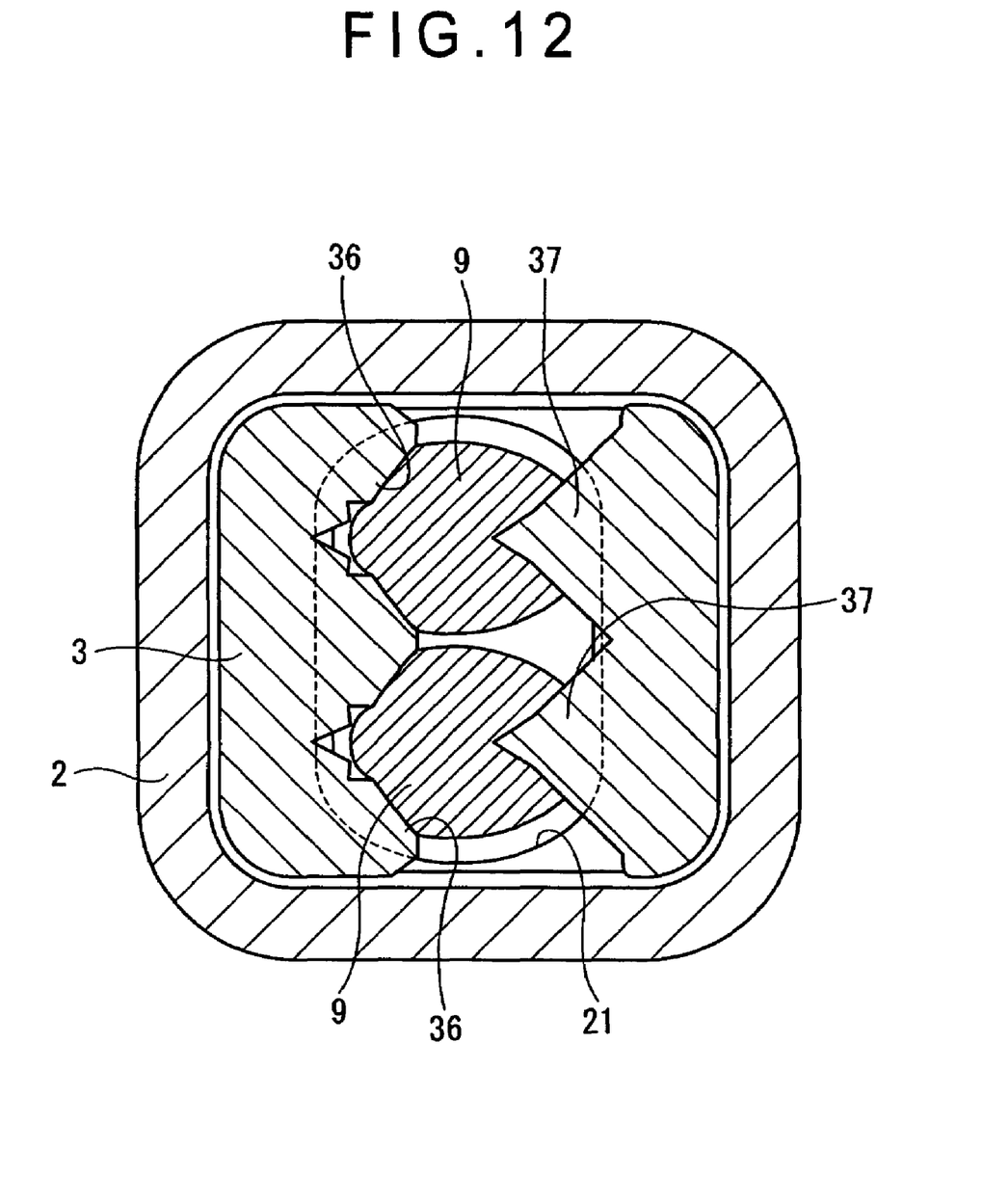
FIG. 12 is a horizontal cross section showing still another embodiment of the present invention.

As shown in FIG. 12, there may also be employed an arrangement in which the two cords 9 are inserted into one cord opening 21. In this embodiment, the arrangement is basically the same as the one in the embodiment of FIG. 1, but the two pairs of the holding sections 36 and the pressing projections 37 are arranged adjacent to each other between the pair of arms 32 to hold the two cords 9.

Further, there may be employed an arrangement in which the cords 9 are inserted into the socket 2 from sides opposite to each other (in opposite insertion directions), in addition to the arrangement in which the cords 9 are inserted into the socket 2 in a common insertion direction as shown in FIGS. 11 and 12. Examples of such arrangement may include an arrangement in which the plug 3 is provided for each of the inserting directions and an arrangement in which, for instance, two cord stoppers 1 as shown in FIG. 1 are arranged reversely in a row.

The arrangement of the engaging section for engaging the plug within the socket is not particularly limited, and the shape of the engaging dent provided to the socket is not particularly limited, either. The engaging section can have any arrangement as long as it engages the plug within the socket and allows the movement of the plug in a direction in which the cord is pulled. For instance, a projection may be provided as a stopper for stopping the plug having been inserted into the socket so as not to be moved in a direction opposite to the direction in which the cord is pulled instead of providing the dent having the length 1.

The cord to be provided with the end treatment may be any type without limiting to the elastic cord.

The priority application Number JP2005-021509 upon which this patent application is based is hereby incorporated by reference.

What is claimed is:

1. A cord stopper comprising:
   a cylindrical socket into which an end of a cord is inserted from a cord opening;
   a plug that is inserted into the socket from a plug opening formed on a side opposite to the cord opening, the plug grasping the end of the cord; and
   an engaging section for engaging the plug within the socket, the cord stopper fixing the end of the cord within the socket, wherein the plug includes:

at least a pair of arms that can be inserted into the socket, the arms grasping the end of the cord; and a catching section arranged on facing surfaces of the pair of arms to catch the cord grasped between the pair of arms, the catching section including:

a holding section arranged on one of the pair of arms, the holding section having a groove for grasping the cord therein; and a pressing projection arranged on the other one of the pair of arms to press the cord onto the groove of the holding section, the holding section and the pressing projection are arranged substantially at the same position in a longitudinal direction of the pair of arms so as to face each other, the holding section has two holding pieces respectively having inclined surfaces, the inclined surfaces facing each other, and the inclined surfaces of the two holding pieces are positioned closer to each other at piece base sides relative to piece tip sides so that the groove is formed V-shaped.

2. The cord stopper according to claim 1, wherein each of the inclined surfaces facing each other of the holding section has a larger inclination angle at the piece tip side than at the piece base side.

3. The cord stopper according to claim 1, wherein the socket includes a stress applying section for applying a stress to the pair of arms so that the pair of arms grasping the cord therebetween are moved in a direction toward each other as the plug relatively moves from a plug opening side to a cord opening side, the stress applying section including:

a first stress applying section extending from the plug opening to a middle point between the plug opening and the cord opening; and a second stress applying section extending from the first stress applying section to the cord opening, and the second stress applying section is adapted to apply a larger stress than the first stress applying section.

4. The cord stopper according to claim 3, wherein the first stress applying section is formed of a first tapered surface arranged on an inner side of the socket so as to gradually narrow a distance between facing inner walls of the socket from the plug opening toward the cord opening, the second stress applying section is formed of a second tapered surface arranged on an inner side of the socket so as to gradually narrow a distance between facing inner walls of the socket from an end of the first tapered surface toward the cord opening, and the second tapered surface has an inclination angle larger than that of the first tapered surface.

5. The cord stopper according to claim 4, wherein a tip tapered surface is arranged on each of the tip sides of the arms to receive the stress applied by the stress applying section, the tip sides of the arms being positioned on the cord opening side when the arms are inserted into the socket, and the tapered surface constituting the second stress applying section has an inclination angle corresponding to the tip tapered surface.

6. The cord stopper according to claim 1, wherein the holding section and the pressing projection are arranged on tip sides of the pair of arms.

* * * * *